US008662620B2

(12) United States Patent
Urban et al.

(10) Patent No.: US 8,662,620 B2
(45) Date of Patent: Mar. 4, 2014

(54) INDIRECT TEMPERATURE MONITORING FOR THERMAL CONTROL OF A MOTOR IN A PRINTER

(75) Inventors: Carl T. Urban, Portland, OR (US); Joseph Lindley Lawson, Rochester, NY (US); Paul Gregory Van Gasse, Portland, OR (US); Katie Maria Teslow, Newberg, OR (US); Ngoc-Diep Nguyen, Portland, OR (US); Michael E. Jones, West Linn, OR (US); Michael Edward Norkitis, Seoul (KR)

(73) Assignee: Xerox Corporation, Norwalk, CT (US)

( * ) Notice: Subject to any disclaimer, the term of this patent is extended or adjusted under 35 U.S.C. 154(b) by 192 days.

(21) Appl. No.: 13/301,485

(22) Filed: Nov. 21, 2011

(65) Prior Publication Data

US 2013/0127944 A1 May 23, 2013

(51) Int. Cl.
*B41J 29/38* (2006.01)
*H02P 7/00* (2006.01)

(52) U.S. Cl.
USPC .......................................... 347/17; 318/432

(58) Field of Classification Search
CPC ................................ B41J 29/387; G01K 7/42
USPC ......................... 347/5, 17, 103; 318/432–434
See application file for complete search history.

(56) References Cited

U.S. PATENT DOCUMENTS

| | | | | |
|---|---|---|---|---|
| 4,350,937 | A | 9/1982 | Miyazaki et al. | |
| 5,134,349 | A | 7/1992 | Kruse | |
| 5,854,547 | A | 12/1998 | Nakazawa | |
| 6,046,554 | A | 4/2000 | Becerra | |
| 6,690,137 | B2 | 2/2004 | Iwaji et al. | |
| 7,042,180 | B2 | 5/2006 | Terry et al. | |
| 7,102,314 | B2 | 9/2006 | Hayashi | |
| 7,129,660 | B2 | 10/2006 | Fujita et al. | |
| 7,248,009 | B1 * | 7/2007 | Sundquist | 318/434 |
| 7,791,328 | B2 | 9/2010 | Sheahan | |
| 7,798,631 | B2 * | 9/2010 | McConville et al. | 347/102 |
| 2003/0227706 | A1 | 12/2003 | Beppu | |
| 2005/0029975 | A1 | 2/2005 | Carson et al. | |
| 2006/0179895 | A1 | 8/2006 | Thorn et al. | |
| 2007/0070560 | A1 | 3/2007 | Hikawa et al. | |
| 2007/0153433 | A1 | 7/2007 | Sundquist | |
| 2010/0002744 | A1 | 1/2010 | Shehan | |
| 2010/0039055 | A1 | 2/2010 | Jeung | |
| 2010/0156338 | A1 | 6/2010 | Lu et al. | |

* cited by examiner

*Primary Examiner* — An Do
(74) *Attorney, Agent, or Firm* — Maginot, Moore & Beck, LLP

(57) ABSTRACT

In one embodiment, a method of operating a permanent magnet direct current (PMDC) motor in a printer has been developed. The method includes identifying that a temperature of the PMDC motor exceeds an operating temperature of the motor without the use of a direct temperature sensor. The PMDC motor operates at a reduced printing rate to prevent the motor from overheating.

21 Claims, 3 Drawing Sheets

INDIRECT TEMPERATURE MONITORING FOR THERMAL CONTROL OF A MOTOR IN A PRINTER

TECHNICAL FIELD

This disclosure relates generally to monitoring and control of an electric motor, and, more particularly, to temperature monitoring and control of electric motors in printers.

BACKGROUND

A wide range of electromechanical devices use electrical motors during operation. One common type of electrical motor is a permanent magnet direct current (DC) motor, also referred to as a PMDC motor. A PMDC motor typically includes two permanent magnets, such as a neodymium or ferrite magnets, with three or more rotors positioned between the magnets. A wire coil, referred to as a brush, in each of the rotors receives an electric current through a commutator and generates an electromagnetic field that is misaligned with the magnetic field of the permanent magnets. The rotors rotate around an axle towards the alignment of the magnetic field, but prior to reaching full alignment with the permanent magnets, the commutator rotates to a position that reverses the electric current and corresponding electromagnetic field in the rotors. The continuous flow of electric current and misaligned magnetic fields generates a rotational motion and torque that drive an axle in the electric motor. In one common alternative design referred to as a brushless DC motor, the permanent magnets rotate inside of an armature coil, and an electronic commutator controller reverses the electromagnetic field in the armature coil to drive the rotating permanent magnets and rotate the axle. In these and other PMDC embodiments, the rotating axle generates a drive torque and provides motive force to a wide variety of mechanical devices.

One class of devices that use PMDC motors includes printers and other imaging devices such as copiers, scanners, facsimile machines, and multi-function devices. Printers can use one or more electric motors, also referred to as actuators, to move paper sheets and other print media through the printer. Many printer embodiments use an electric motor to rotate a cylindrical drum or an endless belt as part of an imaging process. For example, in xerographic printers an electric motor rotates a fuser roller that applies pressure and heat to fix a toner pattern to a print medium. Another example includes indirect or offset inkjet printers. In an indirect inkjet printer, an electric motor rotates an indirect image receiving member, such as a cylindrical drum or an endless belt, past one or more printheads. The printheads eject ink drops onto the indirect image receiving member to form an ink image. The ink image is subsequently transferred to a print medium such as a paper sheet using a "transfix" operation that applies pressure and optionally heat to transfer the ink image to the print medium.

In operation, the temperature of a PMDC motor affects the maximum torque that the axle generates for a given level of electric current and voltage supplied to the motor. The temperature of the motor rises during operation due to the electrical resistance of the motor, mechanical friction, and due to an elevated temperature inside of the printer. As the temperature of the motor rises, the magnetic field of the permanent magnets weakens, the electrical resistances of the windings in the motor increase, and the torque generated at the axle decreases. If the motor temperature is too high, the motor may be unable to provide sufficient torque to operate printer components within specified tolerances, and excessive temperatures can result in damage to the motor. In a printer, a reduction in torque generated by an electric motor can result in a paper jam or other failure in the print process. Thus, monitoring and controlling the temperature of one or more motors in a printer or other mechanical device to prevent overheating enables the device to operate as designed and lengthens the operational life of the device.

While thermistors and other temperature sensors can monitor the temperature of a motor, the temperature sensors add cost and complexity to the printer and can generate unreliable readings. Additionally, fans and other cooling devices also add complexity to the printer and can fail during operation, resulting in an overheated motor. Consequently, improved operations in a printer that prevent overheating of the motors without the need for additional temperature sensors or cooling devices would be beneficial.

SUMMARY

In one embodiment, a method of operating a permanent magnet direct current (PMDC) motor in an indirect printer has been developed. The method includes identifying an operational voltage of the PMDC motor while an image receiving member rotates during imaging operations, comparing the identified operational voltage of the PMDC motor to a predetermined operational voltage to detect a temperature of the PMDC motor, and reducing a rotational speed of the image receiving member during at least one of a transfixing operation and an imaging operation in response to the identified operational voltage being less than the predetermined operational voltage.

In another embodiment, a method of operating a permanent magnet direct current (PMDC) motor in an indirect printer has been developed. The method includes identifying an operational voltage of the PMDC motor while an image receiving member rotates during imaging operations, comparing the identified operational voltage of the PMDC motor to a predetermined operational voltage to detect a temperature of the PMDC motor, identifying a position error for the image receiving member during the imaging operations, comparing the identified position error for the image receiving member to a predetermined position error threshold to detect the temperature of the PMDC motor, and reducing a rotational speed of the image receiving member during at least one of a transfixing operation and an imaging operation in response to either the identified operational voltage being less than the predetermined operational voltage or the identified position error being greater than the predetermined position error threshold for a predetermined number of transfixing operations.

In another embodiment, an indirect printer has been developed. The indirect printer includes an image receiving member configured for rotation, a PMDC motor operatively connected to the image receiving member to rotate the image receiving member, a voltage sensor operatively connected to the PMDC motor to generate a signal corresponding to an operational voltage of the PMDC motor, a position sensor operatively connected to the image receiving member to generate a signal corresponding to a position error for the image receiving member during transfixing operations, and a controller operatively connected to the PMDC motor, the voltage sensor, and the position sensor. The controller is configured to monitor the signal from the voltage sensor and to monitor the signal from the position sensor and generate a signal that regulates a speed at which the PMDC motor rotates the image receiving member, the controller generating the signal to the PMDC motor to reduce the speed at which the PMDC motor rotates the image receiving member in response to either the signal from the voltage sensor indicating the operational voltage is less than a predetermined operational voltage or the signal from the position sensor indicating the position error is greater than a predetermined position error threshold for a predetermined number of transfixing operations.

DETAILED DESCRIPTION

Figure 1:
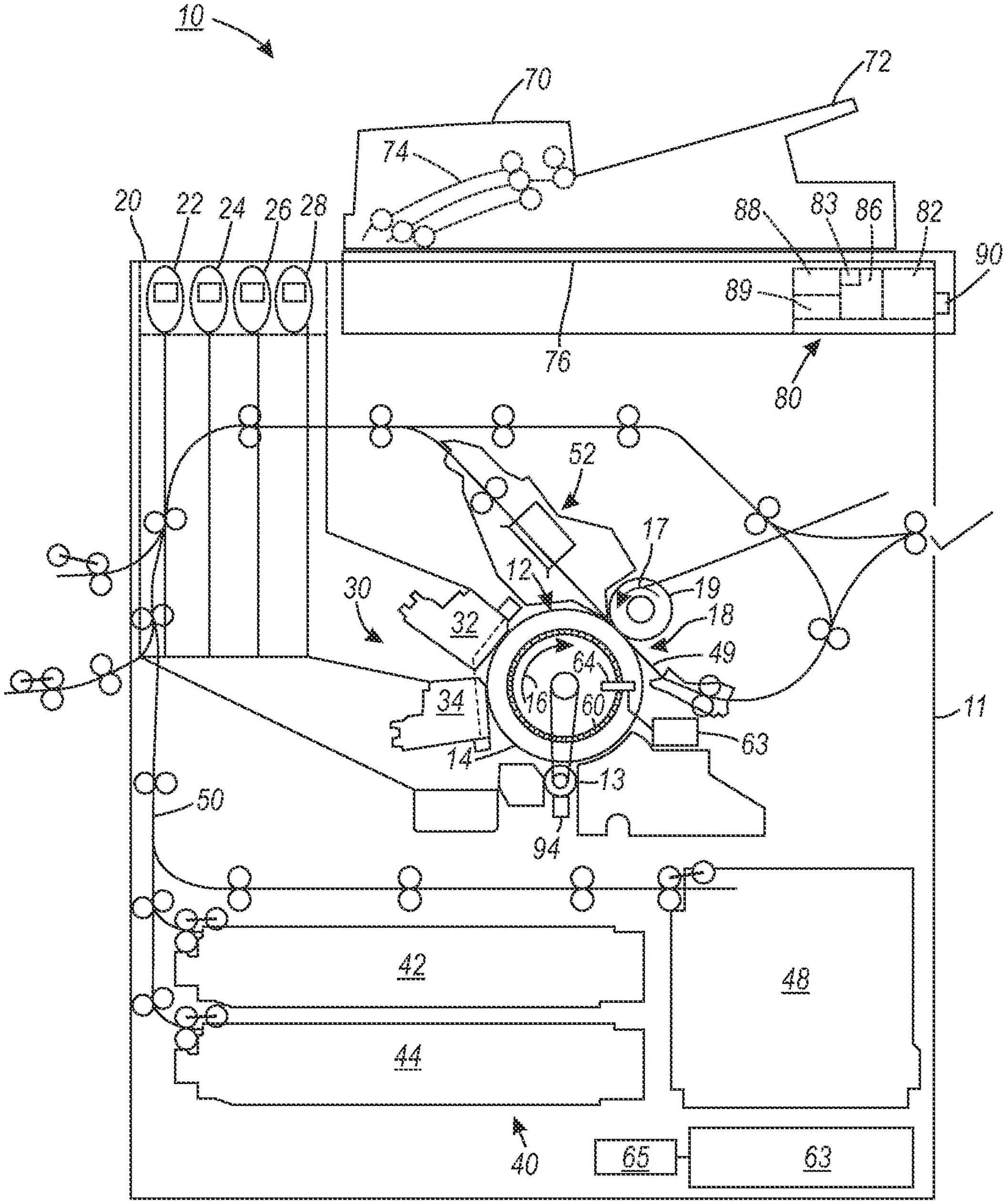
FIG. 1 is a schematic diagram of an indirect inkjet printer that is configured to monitor a temperature of at least one PMDC motor and adjust the operating speed of the motor to prevent the motor from overheating during operation.

For a general understanding of the present embodiments, reference is made to the drawings. In the drawings, like reference numerals have been used throughout to designate like elements. As used herein, the terms "printer" generally refer to an apparatus that applies an ink image to print media and may encompass any apparatus, such as a digital copier, bookmaking machine, facsimile machine, multi-function machine, etc. which performs a printing function for any purpose.

As used in this document, "ink" refers to a colorant that is liquid when applied to an image receiving member. For example, ink may be aqueous ink, ink emulsions, solvent based inks and phase change inks. Phase changes inks are inks that are in a solid or gelatinous state at room temperature and change to a liquid state when heated to an operating temperature for application or ejection onto an image receiving member. The phase change inks return to a solid or gelatinous state when cooled on print media after the printing process. "Print media" can be a physical sheet of paper, plastic, or other suitable physical substrate suitable for receiving ink images, whether precut or web fed.

As used herein, the term "direct printer" refers to a printer that ejects ink drops directly onto a print medium to form the ink images. As used herein, the term "indirect printer" refers to a printer having an intermediate image receiving member, such as a rotating drum or endless belt, which receives ink drops that form an ink image. In the indirect printer, the ink image is transferred from the indirect member to a print medium via a "transfix" operation that is well known in the art. A printer may include a variety of other components, such as finishers, paper feeders, and the like, and may be embodied as a copier, printer, or a multifunction machine. Image data corresponding to an ink image generally may include information in electronic form, which is to be rendered on print media by a marking engine and may include text, graphics, pictures, and the like.

The term "printhead" as used herein refers to a component in the printer that is configured to eject ink drops onto the image receiving member. A typical printhead includes a plurality of inkjets that are configured to eject ink drops of one or more ink colors onto the image receiving member. The inkjets are arranged in an array of one or more rows and columns. In some embodiments, the inkjets are arranged in staggered diagonal rows across a face of the printhead. Various printer embodiments include one or more printheads that form ink images on the image receiving member.

The term "print job" refers to set of data that control the operations of a printer when printing images on one or more media pages. The print job includes image data that specify text and graphics printed on one or more pages using one or more colors of ink, toner, or other marking agent. The print job also includes additional parameters including, but not limited to, print quality parameters, simplex or duplex job parameters, and the number of copies of each page to printed.

FIG. 1 depicts an embodiment of an inkjet printer 10 including a single-color printhead assembly 32 and multi-color printhead assembly 34, rotating imaging drum 12, permanent magnet direct current (PMDC) motor 13, controller 80, and voltage sensor 94. As illustrated, the printer 10 includes a frame 11 to which the operating subsystems and components described below are mounted directly or indirectly. The indirect phase change inkjet printer 10 includes an intermediate image receiving member 12 that is shown in the form of an imaging drum, but in other embodiments is in the form of a supported endless belt. The imaging drum 12 has an image receiving surface 14 that is movable in the direction 16, and on which phase change ink images are formed. The PMDC motor 13 is mechanically connected to the imaging drum 12 and rotates the imaging drum 12 in direction 16 at various rotational speeds during imaging and transfixing operations. In some embodiments, the PMDC motor 13 engages the imaging drum through a mechanical transmission (not shown) that includes multiple gear ratios. Changes to the gear ratios of the transmission enable the PMDC motor 13 to apply different levels of torque to the imaging drum 12 while operating at a substantially constant rotational speed. A transfix roller 19 rotatable in the direction 17 is selectively loaded against the surface 14 of drum 12 to form a transfix nip 18 within which ink images formed on the surface 14 are transfixed onto a heated media sheet 49.

Operation and control of the various subsystems, components and functions of the printer 10, including the PMDC motor 13 and printhead assemblies 32 and 34, are performed with the aid of a controller or electronic subsystem (ESS) 80. The ESS or controller 80, for example, is a self-contained, dedicated computer having a central processor unit (CPU) 82 with a memory 83, and a display or user interface (UI) 86. The ESS or controller 80, for example, includes a sensor input and control circuit 88 as well as an ink drop placement and control circuit 89. In addition, the CPU 82 reads, captures, prepares and manages the image data flow associated with print jobs received from image input sources, such as the scanning system 76, or an online or a work station connection 90, and the printhead assemblies 32 and 34. As such, the ESS or controller 80 is the main multi-tasking processor for operating and controlling all of the other printer subsystems and functions.

The controller 80 may be implemented with general or specialized programmable processors that execute programmed instructions, for example, printhead operation. The instructions and data required to perform the programmed functions may be stored in the memory 83 associated with the processors or controllers. The memory 83 includes one or more digital data storage devices including, but not limited to, static and dynamic random access memory (RAM), magnetic and optical disk storage devices, read-only memory (ROM), and solid state data storage devices including NAND flash data storage devices. The processors, their memories, and interface circuitry configure the controllers to perform the processes, described more fully below, that enable the temperature of the PMDC motor to be determined from monitored motor voltages and/or position errors of the image receiving member 12. These components may be provided on a printed circuit card or provided as a circuit in an application specific integrated circuit (ASIC). The CPU 82 may be implemented as a special-purpose VLSI circuit, or may be a general purpose microcontroller or processor including processors in the x86 and ARM families. Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits.

An electrical power supply 63 provides electrical power to the various electronic and electromechanical components in the printer 10. In one embodiment, electrical power supply 63 converts an alternating current (AC) electrical current into one or more direct current (DC) electrical currents having various voltage and current levels. The electrical power supply 63 supplies DC power at various voltage levels to the PMDC motor 13. In the embodiment of FIG. 1, a voltage and current regulator 65 regulates the electrical current supplied to the PMDC motor 13 in response to control signals from the controller 80. The controller 80 monitors the actual voltage level provided to the PMDC motor 13 with a voltage sensor 94.

The phase change ink printer 10 also includes a phase change ink delivery subsystem 20 that has multiple sources of different color phase change inks in solid form. Since the phase change ink printer 10 is a multicolor printer, the ink delivery subsystem 20 includes four (4) sources 22, 24, 26, 28, representing four (4) different colors CMYK (cyan, magenta, yellow, and black) of phase change inks. The phase change ink delivery subsystem also includes a melting and control apparatus (not shown) for melting or phase changing the solid form of the phase change ink into a liquid form. Each of the ink sources 22, 24, 26, and 28 includes a reservoir used to supply the melted ink to the printhead system 30. In the example of FIG. 1, ink source 28 supplies black ink to a single-color printhead assembly 32, and the ink sources 22, 24, and 26 supply cyan, magenta, and yellow inks, respectively, to the multi-color printhead assembly 34.

The phase change ink printer 10 includes a substrate supply and handling subsystem 40. The substrate supply and handling subsystem 40, for example, may include sheet or substrate supply sources 42, 44, 48, of which supply source 48, for example, is a high capacity paper supply or feeder for storing and supplying image receiving substrates in the form of cut sheets 49, for example. The substrate supply and handling subsystem 40 also includes a substrate handling and treatment subsystem 50 that has a substrate heater or preheater assembly 52. The phase change ink printer 10 as shown may also include an original document feeder 70 that has a document holding tray 72, document sheet feeding and retrieval devices 74, and a document exposure and scanning subsystem 76.

In operation, the printer 10 receives a print job containing image data for one or more images from either the scanning subsystem 76 or via the online or work station connection 90. Additionally, the controller determines and/or accepts related subsystem and component controls, for example, from operator inputs via the user interface 86, and accordingly executes such controls. During a warm up operation at the beginning of the print job, the controller 10 may activate one or more heaters in the ink delivery subsystem 20 and the printhead assemblies 32 and 34 to provide molten ink to each of the printheads and inkjets in the printer 10. Printer 10 performs the warm up operation subsequent to leaving a deactivated state or a low power sleep mode prior to commencement of the print job. The temperatures of various components in the frame 11 including the PMDC motor 13 increase to an initial operating temperature as the controller 80 activates the heaters.

Printhead assemblies 32 and 34, when activated, eject ink drops onto selected locations of the imaging surface 14 to form ink images corresponding to the image data. Media sources 42, 44, 48 provide image receiving substrates that pass through substrate treatment system 50 to arrive at transfix nip 18 formed between the image receiving member 12 and transfix roller 19 in timed registration with the ink image formed on the image receiving surface 14. As the ink image and media travel through the nip 18, the ink image is transferred from the surface 14 and fixedly fused to the image substrate within the transfix nip 18. During the imaging and transfixing operations, the controller 80 monitors the temperature of the PMDC motor 13 with reference to signals from the voltage sensor 94 and the optical sensor 64. The controller 80 identifies the temperature and controls the operation of the PMDC motor 13 to prevent the PMDC motor 13 from overheating as described below.

Figure 2:
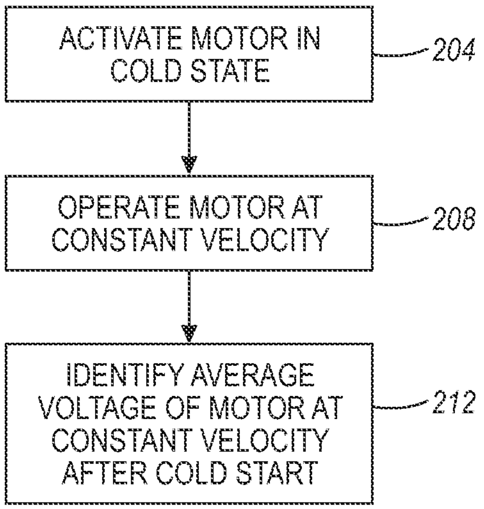
FIG. 2 is a block diagram of a process for calibrating a temperature measurement process for a PMDC motor with reference to a drive voltage of the motor when the motor has been deactivated for a predetermined time period.

FIG. 2 depicts a process 200 for calibrating a temperature measurement process for a PMDC motor. FIG. 2 is described in conjunction with the printer 10 of FIG. 1 for illustrative purposes. The following equation provides relationship between voltage and temperature for the motor:

$$T_{actual} = C_T\left(\frac{V_{actual} - V_{Cold}}{V_{Cold}}\right) + T_{Cold}.$$

Where $T_{actual}$ is the temperature of the motor during operation, $C_T$ is an empirical torque loss factor that is identified at the time of manufacture of the printer, $V_{actual}$ is the measured voltage used to operate the motor at a predetermined rotational velocity during a print job, $V_{Cold}$ is a voltage level that rotates the motor with the predetermined rotational velocity when the motor starts from a "cold" state, and $T_{cold}$ is the temperature of the motor as the motor rotates after being in the "cold" state. Process 200 identifies $V_{Cold}$ and $T_{Cold}$ prior to the printer performing print jobs. The value of $C_T$ is determined, at least in part, by the properties of the materials that form the motor, particularly the magnets. Typical values for $C_T$ range from −500 to −1300, depending on the sensitivity of the permanent magnets to temperature.

Process 200 begins by activating the motor from a "cold" state (block 204). As used herein, the terms "cold motor" or "cold state" refer to a motor and printer that have been deactivated for at least a minimum time period before the motor and printer are activated prior to beginning a print job. For example, if a printer restarts after an overnight deactivation period, the printer and motor start in a cold state. In another example, an inactive printer enters a sleep mode where some of the components in the printer are deactivated. When the printer remains in the sleep mode for a sufficient time span, the motor temperature drops to a cold temperature. In the example of printer 10, the PMDC motors in the printer are considered to be in a cold state after a minimum two hour time span when the printer is deactivated or in a sleep mode.

In the printer 10, the "cold" temperature is slightly above the temperature of the ambient environment around the printer. During the printer initialization, various components in the printer activate and the internal temperature of the printer 10 rises. The PMDC motor heats to a cold temperature approximately equal to the internal temperature of the printer even if the ambient temperature of the environment surrounding the printer 10 varies. The printer's internal temperature is driven by the printhead and imaging drum and the temperatures of those components are tightly controlled for optimal image quality. Consequently, $T_{cold}$ in the embodiment of FIG. 1 is a constant value and the printer 10 does not require a separate temperature sensor to identify $T_{cold}$. Various $T_{cold}$ values for different printer configurations can be determined empirically.

While $T_{cold}$ is a constant value, the value for $V_{cold}$ varies due to characteristics of the individual PMDC motors in each instance of the printer 10. A DC constant offset value changes the value of $V_{cold}$ for each PMDC motor, and the DC offset can vary over the life of the PMDC motor. To identify $V_{cold}$, process 200 operates the motor to rotate at a constant operational velocity (block 208) and identifies an average voltage supplied to the motor once the motor is operating at the constant velocity and stores this value for later operational control (block 212).

In the embodiment of printer 10, the PMDC motor 13 rotates the imaging drum 12 at the velocity that the image receiving member rotates during a printing operation as the printheads form ink images on the image receiving member. In process 200, the transfix roller 19 is removed from contact with the rotating imaging drum 12 so that the rotational torque of the imaging drum 12 is substantially the same torque applied to the imaging drum 12 during an image forming process in a print job. As is well known in the art, the voltage value of the PMDC motor varies as the motor accelerates to the constant velocity and for a time after the motor reaches the operating velocity known as a settling period. Even after the settling period, the voltage value continues to vary with a small ripple voltage as the motor operates at the constant velocity. In the printer 10, the controller 80 identifies the average voltage supplied to the motor with voltage sensor 94 after the settling period. The controller 80 samples a plurality of voltage readings from the voltage sensor 94 after the voltage settling period and identifies and stores in memory $V_{cold}$ as the average of the sample voltage readings.

Process 200 can be repeated to identify different values of $V_{cold}$ at various rotational speeds and torque loads for the PMDC motor 13. As described in more detail below, the PMDC motor 13 operates at a reduced power usage level during one or both of the transfixing and imaging operations to control the temperature of the PMDC motor. The reduced power usage level of the motor 13 during the transfixing operation results in a reduced printing rate during times when the temperature of the PMDC motor 13 exceeds $T_{max}$. The printer 10 performs process 200 at the imaging rotational speed to identify a value of $V_{cold}$ that corresponds to the cold motor as the motor operates at the reduced rotational speed. Additionally, the different values of $V_{cold}$ can be identified and stored for various mechanical loads placed on the PMDC motor 13 that place different torque loads on the PMDC motor 13.

Figure 3:
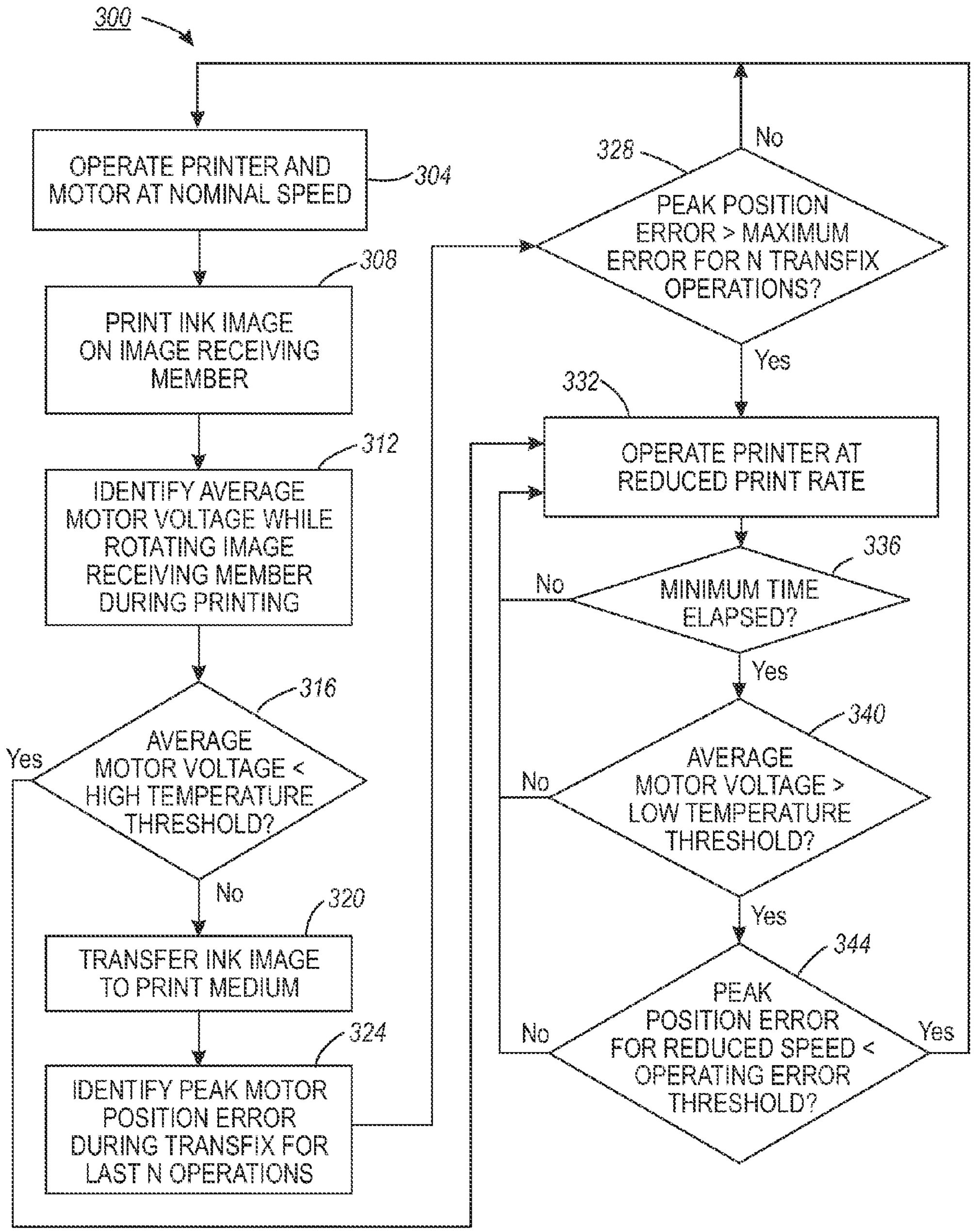
FIG. 3 is a block diagram of a process for identifying and controlling the temperature of a PMDC motor in a printer during printing operations.

FIG. 3 depicts a process 300 for identifying and controlling a temperature of a PMDC motor in a printer. FIG. 3 is described in conjunction with the printer 10 of FIG. 1 for illustrative purposes. Process 300 begins as the printer operates a PMDC motor in the printer at a nominal velocity during a print job (block 304). In FIG. 1, the PMDC motor 13 rotates the imaging drum 12 at a predetermined speed as the print units 32 and 34 eject ink drops onto the surface of the imaging drum 12 (block 308). During imaging process, the transfix roller 19 is removed from contact with the imaging drum 12. The PMDC motor 13 rotates the imaging drum 12 at the same constant rotational velocity as during the calibration process 200. The printer 10 identifies the average voltage of electricity supplied to the PMDC motor 13 that is needed to rotate the imaging drum 12 at the constant nominal velocity (block 312). In the printer 10, the controller 80 receives multiple voltage readings from the voltage sensor 94 and identifies an average voltage $V_{average}$ supplied to the motor.

As described above, the controller 80 identifies the temperature of the motor using equation:

$$T_{actual} = C_T\left(\frac{V_{average} - V_{Cold}}{V_{Cold}}\right) + T_{Cold}.$$

In an alternative form, the equation identifies an average measured voltage $V_{maxtemp}$ that corresponds to a maximum operating temperature threshold.

$$T_{max}\colon\ V_{maxtemp} = V_{Cold} + \frac{V_{Cold}(T_{max} - T_{Cold})}{C_T}$$

The printer generates a value of $V_{cold}$ corresponding to the rotational rate of the PMDC motor 13 and stores the value in the memory 83 during process 200 prior to commencement of the print job. In the printer 10, the $C_T$, $T_{cold}$, and $V_{cold}$ values are retrieved from the memory 83 for use in process 300.

As the temperature of the PMDC motor increases, the voltage supplied to the motor at a constant rotational rate decreases, so $V_{maxtemp}$ is a minimum voltage threshold that corresponds to the maximum operational temperature of the PMDC motor. In printer 10, $T_{max}$ is 75° C., and if the average voltage measured using the voltage sensor 94 is below $V_{maxtemp}$, then the printer 10 identifies that the temperature of the PMDC motor 13 has exceeded $T_{max}$ (block 316). In some configurations, process 300 identifies the average voltage during a series of consecutive imaging operations. If the average measured voltage is less than $V_{maxtemp}$ for each of a predetermined number of consecutive imaging operations, then the controller 80 identifies that the PMDC motor 13 has exceeded the $T_{max}$ temperature. In another configuration, the controller 80 in the printer 10 stores a history of voltage values received from the voltage sensor 94, and identifies a percentage change of the voltage values over time. If the percentage change of the voltage decreases by greater than a predetermined threshold during a series of consecutive imaging operations, then the controller 80 identifies that the PMDC motor 13 has exceeded the $T_{max}$ temperature.

In printer 10, process 300 identifies overheating conditions in the PMDC motor with reference to an identified peak position error of the imaging drum 12 in addition to the above described average voltage measurements. In process 300, the printer transfixes ink images formed on the image receiving member to a media sheet (block 320). In printer 10, the transfix roller 19 moves into engagement with the imaging drum 12 to form the transfix nip 18 after ink images are formed on the imaging drum 12. The PMDC motor 13 rotates the imaging drum 12 at a predetermined transfix rotational velocity, and both the imaging drum 12 and transfix roller 19 rotate as indicated by arrows 16 and 17 to transfix an ink image onto a media sheet 49 passing through the nip 18. When the PMDC motor 13 generates sufficient torque, the media sheet 49 passes through the nip 18 and the pressure applied to the media sheet 49 transfers an ink image from the imaging drum 12 to the media sheet. As described above, however, the PMDC motor 13 generates a lower level of torque as the temperature of the motor increases. As the torque decreases, a corresponding positional error between the rotating imaging drum 12 and the media sheet 49 passing through the nip 18 increases.

Process 300 identifies the peak positional error of the imaging drum and corresponding positional error of the PMDC motor during a series of N consecutive transfixing operations (block 324). In one embodiment of the printer 10, a position sensor includes an optical disk 60 and an optical sensor 64 that measure the rotational velocity and rotational position of the imaging drum 12. The optical disk 60 rotates with the imaging drum 12 and the optical sensor 64 generates signals when the disk 60 interrupts a light beam or an encoded pattern formed on the optical disk passes the optical sensor 64. In other embodiments of the printer 10 the position sensor includes a Hall Effect sensor to identify the rotational velocity and position of the imaging drum 12.

In the printer 10, the controller 80 identifies both variations in the velocity and errors in measured position of the imaging drum 12 compared to an expected rotational position of the imaging drum 12 as the optical disk 60 rotates past the optical sensor 64. The controller 80 identifies positional errors such as a sudden change in movement of the imaging drum 12, indicating slip, and other positional errors using the signals generated by the optical sensor 64. Positional errors between the media sheet 49 and the imaging drum 12 can occur randomly for various reasons other than a torque reduction in the PMDC motor 13. Consequently, the printer 10 maintains a history of identified positional errors for N previous transfixing operations, where N is previous count of transfixing operations such as five previous transfixing operations. Process 300 identifies that the PMDC motor 13 is operating above the maximum operating temperature in response to the peak position error exceeding the maximum peak error threshold for N consecutive transfixing operations (block 328).

In some embodiments, transient positional errors occur as a print medium enters and exits the nip 18. In these embodiments, process 300 ignores the transient errors and measures positional errors as a center of the print medium passes through the nip 18. Additionally, the value of the maximum peak positional error threshold may change based on the type of print medium that passes through the nip 18 during the transfixing operation. For example, if the print medium is a letter sized paper sheet then the magnitude of the peak positional error threshold is less than when the print medium is an envelope that generates larger positional errors even when the PMDC motor operates below the maximum operating temperature.

If either of the average voltage supplied to the PMDC motor 13 drops below $V_{maxtemp}$ (block 316), or the peak positional error measured during the transfixing process exceeds the predetermined threshold (block 328), then the PMDC motor and the printer reduces the power applied to the PMDC motor. The power reduction reduces the amount of heat generated in the motor due to an inherent level of inefficiency present in all PMDC motors, and the temperature of the PMDC motor drops and returns to a nominal operating temperature range.

One method to reduce the power applied to the PMDC motor is to reduce the printing rate (block 332) by a predetermined percentage, for example 50% to 75%. During the reduced printing rate operating mode, the PMDC motor operates at the nominal speeds for transfixing and imaging, but a predetermined time delay is inserted into the print process where the PMDC motor rotates with very little torque output or the PMDC motor ceases rotation. The time delays reduce the average rotational speed of the imaging drum and the PMDC motor during one or both of the transfixing and imaging operations. The time delays enable the temperature of the PMDC motor to drop gradually until the PMDC motor returns to nominal operating temperatures, at which point the normal print rate may resume.

In two other reduced print rate configurations, the PMDC motor performs the transfixing process at a slower speed by engaging a gear ratio reduction mechanism or by simply running the PMDC motor at a slower speed. In both of these configurations, the PMDC consumes a lower level of electrical power used during the transfixing operation, and the lower level of power consumption enables heat to dissipate from the PMDC and reduces the PMDC's temperature. One advantage of the gear ratio reduction mechanism is that the PMDC motor can continue operating within a range of operating speeds that are most efficient for the PMDC motor while heat dissipates from the PMDC motor. Operating the PMDC motor at a reduced speed enables configurations that do not include a transmission with multiple gear ratios to cool the PMDC motor by operating the motor with lower power levels at the reduced operating speed.

In another configuration, the printer adjusts the transfix rotational speed of the PMDC using various forms of a proportional-integral-differential (PID) control system. In one example, the printer identifies the difference between the average measured voltage of the PMDC motor and $V_{maxtemp}$, and reduces the rotational speed of the motor in proportion to the magnitude of the voltage difference.

Some printer configurations also reduce the rotational speed of the PMDC during an imaging operation where the transfix roller unloads from the imaging drum and the printhead assembly prints ink images on the imaging drum. In other embodiments, the PMDC continues to rotate the imaging drum at the nominal speed during the imaging operation because the torque applied to the unloaded imaging drum is sufficiently low that the temperature of the PMDC motor continues to decrease during the imaging portion of the print process.

In the printer 10, the PMDC motor 13 rotates the imaging drum 12 at a lower speed during one or both of the image forming and transfixing operations. Various other components in the printer, such as the printhead assemblies 32 and 34, also operate at different speeds to accommodate the lower rotational velocity of the imaging drum 12. The printer 10 continues to print pages with a reduced throughput in the reduced print rate operating mode. The reduced speed operating mode lasts for a minimum time period (block 336) once the PMDC motor exceeds the maximum operating temperature. The minimum time period enables the PMDC motor to cool to a temperature that is well below the maximum operating temperature to prevent the printer from cycling between the nominal operating speed mode and the reduced operating speed mode in rapid succession. In the printer 10, the minimum time period lasts five minutes, but alternative printer configurations operate in the reduced speed mode for different lengths of time.

During the reduced speed print mode, process 300 continues to identify the average voltage supplied to the PMDC motor and the peak positional error of media sheets during the transfixing operation as described above in blocks 312 and 324, respectively. After the printer has operated in the reduced print rate mode for longer than the minimum time (block 336) the printer and PMDC motor return to the nominal operating speed (block 304) if the average motor voltage exceeds a minimum temperature threshold voltage (block 340) and the peak position error satisfies a low temperature error threshold (block 344). The low temperature voltage threshold in block 344 may differ from the high temperature voltage threshold described in block 316. In printer 10, the high temperature voltage threshold $V_{maxtemp}$ corresponds to a maximum operating temperature of 75° C., while a corresponding $V_{mintemp}$ voltage corresponds to a lower operating temperature of 65° C. Similarly, the peak position error threshold in block 344 is a smaller error than the maximum peak position error threshold in block 328.

While process 300 includes indirect temperature monitoring using both the drive voltage of the PMDC motor and the peak position error of a print medium during the transfix process, alternative processes can use either metric to identify the temperature of the PMDC motor. Additionally, while process 300 describes control of a PMDC motor that rotates the imaging drum 12 in the example embodiment of FIG. 1, the same process can monitor various other motors in printers and other electro-mechanical devices.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

We claim:

1. A method of operating a permanent magnet direct current (PMDC) motor in an indirect printer comprising:

identifying an operational voltage of the PMDC motor with a voltage sensor while the PMDC motor rotates an image receiving member during imaging operations;

comparing the identified operational voltage of the PMDC motor to a predetermined operational voltage with a controller operatively connected to the voltage sensor to detect a temperature of the PMDC motor; and reducing with the controller, which is also operatively connected to the PMDC motor, a rotational speed of the PMDC motor to reduce the rotational speed of the image receiving member during at least one of a transfixing operation and an imaging operation in response to the identified operational voltage being less than the predetermined operational voltage.

2. The method of claim 1 further comprising:

continuing to identify the operational voltage of the PMDC motor with the voltage sensor while the PMDC motor rotates the image receiving member during imaging operations; and increasing with the controller the rotational speed of the PMDC motor to increase the rotational speed of the image receiving member during the transfixing operation and imaging operation in response to the controller detecting the identified operational voltage of the PMDC motor being equal to or greater than the predetermined operational voltage.

3. The method of claim 1 further comprising:

identifying with a position sensor a position error for the image receiving member during transfixing operations;

comparing the identified position error for the image receiving member to a predetermined position error threshold with the controller that is also operatively connected to the position sensor to detect a temperature of the PMDC motor; and reducing with the controller a rotational speed of the PMDC motor to reduce the rotational speed of the image receiving member during at least one of the transfixing operation and the imaging operation in response to the controller detecting the identified position error being greater than the predetermined position error threshold.

4. The method of claim 3 further comprising:

continuing to identify the position error of the image receiving member with the position sensor while the PMDC motor rotates the image receiving member at the reduced rotational speed during transfixing operations; and increasing with the controller the rotational speed of the PMDC motor to increase the rotational speed of the image receiving member during the transfixing operation and the imaging operation in response to the controller detecting the identified position error of the image receiving member being equal to or less than the predetermined position error threshold.

5. The method of claim 3 wherein the controller reduces the rotational speed of the PMDC motor to reduce the rotational speed of the image receiving member in response to the controller detecting the identified position error being greater than the predetermined position error threshold for a predetermined number of transfixing operations.

6. The method of claim 5 wherein the predetermined number of transfixing operations is a number of consecutively performed transfixing operations.

7. The method of claim 3 further comprising:

identifying with the controller the predetermined position error threshold as a peak motor position error detected during a plurality of transfixing operations.

8. The method of claim 1 further comprising:

identifying the predetermined operational voltage of the PMDC motor with the controller as an average operational voltage for operating the PMDC motor during a plurality of imaging operations.

9. The method of claim 8 wherein the reduced rotational speed of the image receiving member is seventy-five percent of the rotational speed of the image receiving member prior to the operational voltage of the PMDC motor being less than the average operational voltage.

10. A method of operating a permanent magnet direct current (PMDC) motor in an indirect printer comprising:

identifying an operational voltage of the PMDC motor with a voltage sensor while the PMDC motor rotates an image receiving member during imaging operations;

comparing the identified operational voltage of the PMDC motor to a predetermined operational voltage with a controller operatively connected to the voltage sensor to detect a temperature of the PMDC motor;

identifying with a position sensor a position error for the image receiving member during the imaging operations;

comparing the identified position error for the image receiving member to a predetermined position error threshold with the controller to detect the temperature of the PMDC motor; and reducing a rotational speed of the PMDC motor to reduce a rotational speed of the image receiving member during at least one of a transfixing operation and an imaging operation in response to either the identified operational voltage being less than the predetermined operational voltage or the identified position error being greater than the predetermined position error threshold for a predetermined number of transfixing operations.

11. The method of claim 10 further comprising:

continuing to identify the operational voltage of the PMDC motor with the voltage sensor while the image receiving member rotates during imaging operations;

continuing to identify the position error of the image receiving member with the position sensor while the image receiving member rotates at the reduced rotational speed during transfixing operations; and increasing with the controller the rotational speed of the PMDC motor to increase the rotational speed of the image receiving member during the transfixing operations and imaging operations in response to either the identified operational voltage of the PMDC motor being equal to or greater than the predetermined operational voltage or the identified position error of the image receiving member being equal to or less than the predetermined position error threshold.

12. The method of claim 10 wherein the predetermined number of transfixing operations is a number of consecutively performed transfixing operations.

13. The method of claim 10 further comprising:

identifying with the controller the predetermined operational voltage of the PMDC motor as an average voltage for operating the PMDC motor during a plurality of imaging operations.

14. The method of claim 10 further comprising:

identifying with the controller the predetermined position error threshold as a peak motor position error detected during a plurality of transfixing operations.

15. The method of claim 10 wherein the reduced rotational speed of the image receiving member is seventy-five percent of the rotational speed of the image receiving member prior to the operational voltage of the PMDC motor being less than the average operational voltage.

16. An indirect printer comprising:

an image receiving member configured for rotation;

a permanent magnet direct current (PMDC) motor operatively connected to the image receiving member to rotate the image receiving member;

a voltage sensor operatively connected to the PMDC motor to generate a signal corresponding to an operational voltage of the PMDC motor;

a position sensor operatively connected to the image receiving member to generate a signal corresponding to a position error for the image receiving member during transfixing operations; and a controller operatively connected to the PMDC motor, the voltage sensor, and the position sensor, the controller being configured to monitor the signal from the voltage sensor and to monitor the signal from the position sensor and generate a signal that regulates a speed at which the PMDC motor rotates the image receiving member, the controller generating the signal to the PMDC motor to reduce the speed at which the PMDC motor rotates the image receiving member in response to either the signal from the voltage sensor indicating the operational voltage is less than a predetermined operational voltage or the signal from the position sensor indicating the position error is greater than a predetermined position error threshold for a predetermined number of transfixing operations.

17. The printer of claim 16, the controller being further configured to:

generate the signal to the PMDC motor to increase the speed at which the PMDC motor rotates the image receiving member in response to either the signal from the voltage sensor indicating the operational voltage is equal to or greater than the predetermined operational voltage or the signal from the position sensor indicating the position error is equal to or less than the predetermined position error threshold.

18. The printer of claim 16 wherein the predetermined number of transfixing operations is a number of consecutively performed transfixing operations.

19. The printer of claim 16 wherein the predetermined operational voltage of the PMDC motor is an average voltage for operating the PMDC during a plurality of imaging operations.

20. The printer of claim 16 wherein the predetermined position error threshold is a peak motor position error detected during a plurality of transfixing operations.

21. The printer of claim 16 wherein the signal to the PMDC motor to reduce the speed at which the image receiving member is rotated reduces the speed at which the image receiving member is rotated to seventy-five percent of the speed at which the image receiving member rotated prior to the controller generating the signal to reduce the speed of the image receiving member.

* * * * *